United States Patent [19]

Willis

[11] Patent Number: 4,599,642

[45] Date of Patent: * Jul. 8, 1986

[54] VIDEO SIGNAL PROCESSOR WITH BIAS ERROR COMPENSATION

[75] Inventor: Donald H. Willis, Indianapolis, Ind.

[73] Assignee: RCA Corporation, Princeton, N.J.

[*] Notice: The portion of the term of this patent subsequent to Nov. 19, 2002 has been disclaimed.

[21] Appl. No.: 535,390

[22] Filed: Mar. 2, 1984

[51] Int. Cl.[4] .......................... H04N 9/20; H04N 5/68; H04N 9/16; H04N 9/535

[52] U.S. Cl. ........................................ 358/65; 358/29; 358/74; 358/243

[58] Field of Search ................... 358/29, 64, 65, 74, 358/243

[56] References Cited

U.S. PATENT DOCUMENTS 4,516,152 5/1985 Willis ..................................... 358/74
4,554,578 11/1985 Willis ..................................... 358/65

OTHER PUBLICATIONS

Selected Pages From a Technical Bulletin of the Semiconductor Division of ITT Corporation, titled "Digit 2000 VLSI Digital TV System."

Primary Examiner—James J. Groody
Assistant Examiner—Randall S. Svihla
Attorney, Agent, or Firm—P. J. Rasmussen; P. M. Emanuel; R. H. Kurdyla

[57] ABSTRACT

A color television receiver with luminance and chrominance signal channels includes an automatic kinescope beam current limiter, an automatic white level drive control network, and an automatic black level bias control network. A switching network is timed to operate such that a control signal developed by the beam current limiter is coupled to the luminance channel during normal picture intervals, but is decoupled from the luminance channel during both white level drive control intervals and black level bias control intervals. The beam limiter control signal is continuously coupled to the chrominance channel, independent of the operation of the switching network, to permit chrominance output bias offset errors produced by beam limiter action to be sensed and compensated for by the automatic bias control network.

7 Claims, 4 Drawing Figures

VIDEO SIGNAL PROCESSOR WITH BIAS ERROR COMPENSATION

This invention concerns a video signal processing and display system, such as a television receiver or video monitor, which includes apparatus for automatically controlling the operating characteristics of signal processing circuits associated with the system. In particular, this invention concerns an arrangement for reducing bias errors in conjunction with the operation of the automatic control apparatus.

Color television receivers sometimes employ several control circuits for automatically controlling various aspects of receiver operation. For example, a color television receiver may employ an automatic beam current limiter for limiting excessive beam currents conducted by a kinescope of the receiver, and automatic black level bias control circuit for maintaining a desired level of black current conduction by the kinescope, and an automatic "white balance" drive control circuit to compensate for variations of those kinescope electron gun emission characteristics which relate to the signal gain of the electron guns.

A color television receiver system which includes both automatic white balance and automatic beam limiter control networks is described in my copending U.S. patent application Ser. No. 497,157, now U.S. Pat. No. 4,516,152, titled "Video Signal Processor with Automatic Kinescope White Balance and Beam Current Limiter Control Systems," filed May 23, 1983. In that system an output control voltage from the beam limiter network is decoupled from the luminance and chrominance channels of the receiver during intervals when the white balance control system is operating so that the operation of the white balance system is not adversely affected by the beam limiter control voltage. A receiver of the latter type may also incorporate an automatic kinescope bias (AKB) control network for maintaining a desired level of kinescope black current conduction.

It is herein recognized that the AKB system should maintain a desired level of kinescope black current conduction in response to factors including bias offset errors introduced by the action of the automatic beam current limiter as well as in response to more conventional factors such as kinescope aging and temperature effects. More specifically, chrominance channel output bias offset errors can result when the chrominance signal processing circuits are gain controlled by the beam current limiter. Such bias offsets can cause a reproduced image to exhibit noticeable color errors, and should be eliminated or compensated for.

One approach to compensating such bias offset errors, in a receiver of the latter type, is disclosed in my concurrently filed U.S. patent application Ser. No. 585,388, now U.S. Pat. No. 4,554,578, titled "Error Compensated Control System in a Video Signal Processor", filed Mar. 2, 1984. As described therein, an electronic switch responds to timing signals for coupling the beam limiter control voltage to the luminance and chrominance channels during automatic bias control intervals so that chrominance output bias errors are sensed and compensated for by the bias control system, and for decoupling the control voltage from the luminance and chrominance channels during white balance drive control intervals to prevent the white balance control operation from being distorted by the beam limiter control voltage.

It is herein recognized that in some receivers it may be impractical or undesirable to arrange the timing of the electronic switch such that the switch couples the control voltage to the chrominance channel during the automatic bias control intervals. Therefore in accordance with the principles of the present invention in a receiver of the aforementioned type with both automatic white balance and automatic kinescope bias control arrangements and also an automatic beam current limiter, the beam limiter output control voltage is continuously coupled to the chrominance channel, independent of the operation of the switch, so that the bias offset errors in the chrominance channel caused by the gain controlling effect of the beam limiter control voltage can be sensed and compensated for by the AKB control system.

Figure 1:
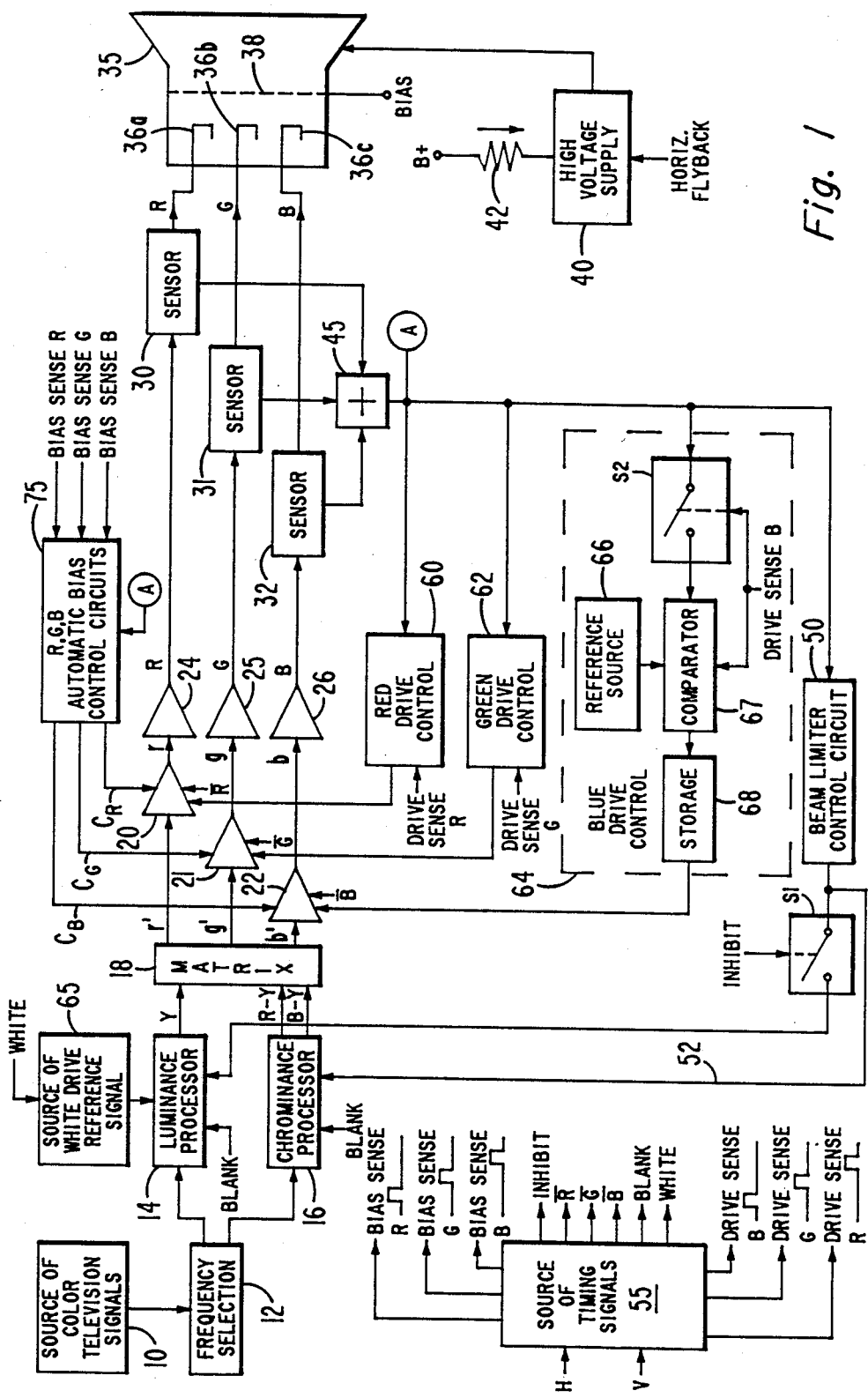
FIG. 1 shows a portion of a color television receiver including an automatic white balance control system, an automatic kinescope beam current limiter system, and an automatic bias control system together with apparatus according to the present invention.

In FIG. 1, color television signals from a source 10 are supplied to a frequency selection network 12 (e.g., including a comb filter) for providing a separated luminance component of the television signal to a luminance processor 14 in a luminance channel of the receiver, and a separated chrominance component to a chrominance processor 16 in a chrominance channel of the receiver. Chrominance processor 16 provides output R-Y and B-Y color difference signals which are combined in a matrix 18 with an output luminance signal Y from processor 14. Matrix 18 supplies low level r', g' and b' color image representative signals to respective gain controllable amplifiers 20, 21 and 22, which in turn respectively provide amplified r, g and b color signals to video output kinescope driver amplifiers 24, 25 and 26. The kinescope driver amplifiers produce high level R, G and B color signals suitable for driving intensity control cathode electrodes 36a, 36b and 36c of a color kinescope 35. The respective output signals from the kinescope driver amplifiers are coupled to kinescope cathodes 36a, 36b and 36c via current sensing networks 30, 31 and 32.

Kinescope 35 is of the self-converging, "in-line" gun type with a single control grid electrode 38 commonly biased with respect to each of cathodes 36a, 36b and 36c, which comprise separate red, green and blue kinescope electron guns with grid 38. A high operating voltage for the anode electrode of kinescope 35 is provided from a high voltage supply 40 in response to horizontal flyback pulses derived from deflection circuits of the receiver. Kinescope beam resupply currents are supplied to high voltage supply 40 via a resistor 42 associated with a DC operating potential (B+).

The receiver also includes an automatic kinescope beam current limiter control circuit 50 for limiting the magnitude of video signals applied to kinescope 35 to thereby limit excessive kinescope beam currents when the kinescope is sensed as conducting excessive beam currents (cathode currents) above a given threshold level. During image scanning (trace) intervals of the video signal, the magnitudes of the video image representative kinescope cathode currents are respectively sensed by networks 30, 31 and 32, and the sensed currents are combined in a network 45 to produce a total sensed current related to the total kinescope cathode current. The magnitude of this current is sensed by beam limiter control circuit 50, which develops and stores (e.g., by means of a capacitor) an output control signal related to the amount by which the sensed kinescope current exceeds the given threshold level. During normal picture intervals this control signal is coupled via an electronic switch S1 to luminance processor 14, and via a conductor 52 to chrominance processor 16, with a polarity for limiting the magnitudes of the chrominance and luminance signals to thereby limit the kinescope beam current to a prescribed safe level.

Beam current limiting is accomplished over a given range of excessive beam currents by reducing the peak-to-peak amplitudes of the luminance and chrominance signals. Many color television receivers include a circuit, e.g., comprising a viewer adjustable potentiometer, for simultaneously controlling the amplitudes of the luminance and chrominance signals. The beam limiter control signal can be applied to such circuit for the purpose of simultaneously controlling the amplitudes of the luminance and chrominance signals.

Figure 2:
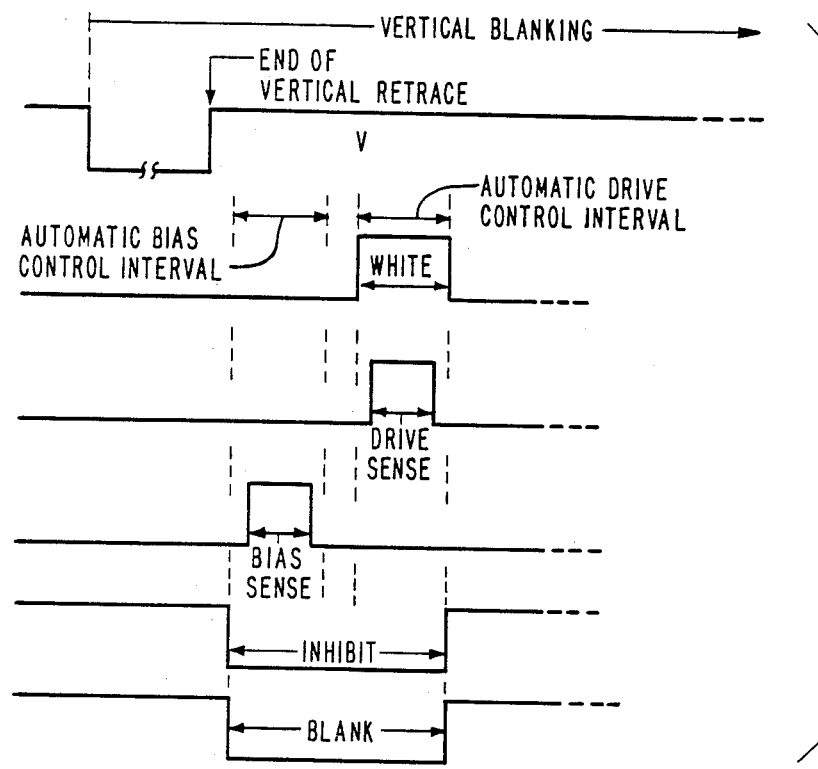
FIGS. 2 and 2a show timing signal waveforms helpful in understanding the operation of the arrangement of FIG. 1.

The operation of switch S1 is associated with the operation of an automatic white balance control system of the receiver. Switch S1 responds to an INHIBIT timing signal, as shown in FIG. 2, such that when switch S1 is in an open, non-conductive condition during automatic white balance drive control interval the beam limiter control voltage is decoupled from the control input of luminance processor 14. Switch S1 is caused to exhibit a conductive, closed condition during normal picture (image scanning) intervals whereby the beam limiter control voltage operates to limit excessive beam currents by controlling the conduction of luminance processor 14.

The white balance system automatically compensates for variations of the kinescope electron gun emission characteristics which relate to the gains of the electron guns, in order to maintain proper drive ratios for the electron guns. Since the gain characteristics of the electron guns are subject to changing with temperature and aging for example, the ability of the kinescope to properly produce a white display in response to a white video drive signal is impaired unless compensation is provided such as by means of the white balance system.

The white balance system comprises plural drive control networks 60, 62 and 64 respectively associated with the red, green and blue kinescope cathode signal coupling paths, and a source of white drive reference signal 65 coupled to luminance processor 14. Except as otherwise noted, the functional elements of drive control networks 60, 62 and 64 are similar. Accordingly, only the functional elements of drive control network 64 for the blue kinescope electron gun are shown and will be discussed.

Figure 2A:
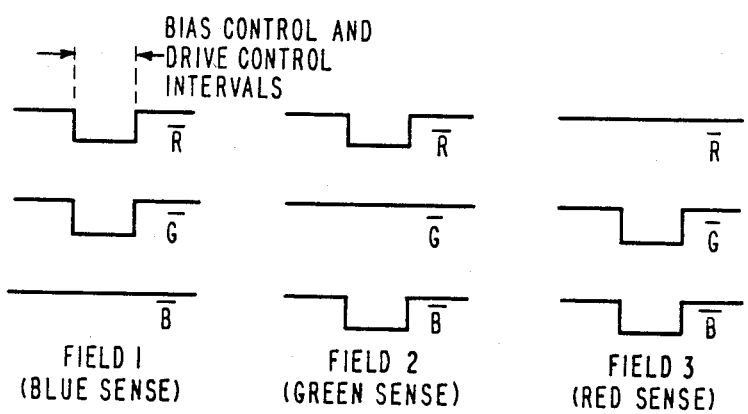

The following discussion of the operation of the white balance system is made with reference to the timing signal waveforms shown in FIGS. 2 and 2a. These timing signals are provided by a timing signal generator 55, which responds to vertical (V) and horizontal (H) image synchronizing signals derived from deflection circuits of the receiver, and which may include combinational logic circuits such as logic gates and sequential logic circuits such as binary counters.

At the end of each vertical field retrace interval during each vertical blanking interval, at which time video image information is absent, a reference signal (e.g., a DC voltage) representative of a significant white drive level luminance signal is coupled to luminance processor 14 from reference source 65. This coupling is enabled by a WHITE timing signal which occurs during an automatic white drive control interval encompassing a few horizontal line intervals. The magnitude of the white reference signal applied to luminance processor 14 can be about 10% of a full white luminance signal, although some receiver systems may require a larger white reference signal approaching the magnitude of a normally expected 100% peak white luminance signal. At this time a BLANK signal is applied to chrominance processor 16, and to circuits in luminance processor 14 which precede the circuits to which the white reference signal is applied. The BLANK signal renders the preceding circuits in luminance processor 14 non-conductive to assure that spurious signals and video signal synchronizing components do not disturb the operations of the white balance system. Also at this time, $\overline{R}$ and $\overline{G}$ signals are applied to red and green signal amplifiers 20 and 21 with an amplitude and sense for rendering these amplifiers non-conductive when the white balance system operates with respect to the blue kinescope electron gun signal path. That is, of the red, green and blue gain controllable amplifiers 20, 21 and 22, only blue amplifier 22 remains conductive when the white balance system operates with respect to the blue signal path and the associated blue kinescope electron gun.

As seen from FIG. 2a, during a first vertical field blanking interval when the blue kinescope electron gun white current is sensed, negative-going signals $\overline{R}$ and $\overline{G}$ render amplifiers 20 and 21 non-conductive while the condition of signal $\overline{B}$ permits blue amplifier 22 to remain conductive during the white balance drive control interval. Negative-going signals $\overline{R}$ and $\overline{G}$ also encompass the AKB bias control interval, to facilitate the operation of the AKB system as will be described subsequently. The relative conditions of the $\overline{R}$, $\overline{G}$ and $\overline{B}$ signals during succeeding second and third field blanking intervals, when the green and red electron gun currents are respectively sensed, are also shown in FIG. 2a.

The white reference signal is conducted via amplifier 22 and associated kinescope driver amplifier 26 to produce a white reference drive signal for the blue kinescope electron gun comprising cathode 36c. The corresponding white reference level current conducted by blue cathode 36c is sensed by sensor 32 and coupled via network 45 to the input of blue drive control network 64.

Timing signal source 55 provides DRIVE SENSE R (red), DRIVE SENSE G (green) and DRIVE SENSE B (blue) signals. These plural signals, which are respectively coupled to control networks 60, 62 and 64, each include a positive pulse component for enabling control networks 60, 62 and 64 to operate individually on a field-sequential basis. That is, the pulse components are mutually timed so that network 60 operates alone during a first field, network 62 operates alone during the next field, network 64 operates alone during the following field, and so on.

Blue drive control network 64 comprises an electronic switch S2 at its input, a source of reference current 66, a differential current comparator 67, and an output storage network 68. Both input switch S2 and comparator 67 are controlled in response to a DRIVE SENSE B signal which occurs during the interval encompassed by the WHITE timing signal. The magnitude of the reference current from source 66 is preselected such that it corresponds to the magnitude of the blue cathode current, as supplied to comparator 67, when the latter current as conducted in response to the white reference signal is correct. Thus the magnitude of the white reference signal from source 65 and the magnitude of the reference current from source 66 are related and selected one with respect to the other.

During the white drive current sensing interval for the blue electron gun, switch S2 is rendered conductive and comparator 67 operates in response to the DRIVE SENSE B signal. The comparator produces an output error correction signal if the blue gun current is too high or too low. The correction signal is stored by network 68 and is applied to a gain control input of amplifier 22 for changing the gain of amplifier 22 with a sense for producing a correct blue gun current. Storage network 68 maintains the error correction signal at the gain control input of amplifier 22 until the next blue gun current sensing interval, which occurs three vertical fields later. The gain correction output signal from comparator 67 remains unchanged if the currents sensed by comparator 67 are substantially equal, indicating that the current conduction level (gain) of the blue electron gun is correct.

Red and green drive control networks 60 and 62 operate in a similar fashion during subsequent field blanking intervals with respect to the red and green electron gun white balance measurements. The levels of the reference currents supplied by the reference current sources in red and green drive control networks 60 and 62 are selected in accordance with normally "correct" gain-related emission characteristics of the red and green electron guns. Also, the input switch and comparator associated with red and green drive control networks 60, 62 are rendered non-conductive during the white drive measuring interval for the blue electron gun. For such purpose the DRIVE SENSE R and DRIVE SENSE G signals applied to the input switch and comparator of networks 60,62 exhibits a magnitude and polarity sufficient to maintain the input switch and comparator of networks 60,62 non-conductive during the blue electron gun white drive measuring interval. That is, only that drive control network associated with the electron gun under test is rendered operative during a given field interval.

Each of sensors 30-32 may comprise a high voltage PNP emitter-follower connected transistor included in the cathode signal coupling path, with a base input electrode coupled to the output of the associated kinescope driver amplifier, an emitter output electrode coupled to the associated kinescope cathode, and a collector electrode coupled to a current summing junction (comprising network 45 in FIG. 1). Beam limiter control circuit 50 can incorporate circuitry of the type shown in U.S. Pat. No. 4,167,025 of D. H. Willis. Details of a circuit suitable for use as each of current sensors 30-32, as well as details of circuits suitable for use as beam limiter control circuit 50, are also shown in my aforementioned U.S. patent application Ser. No. 497,157, incorporated by reference herein.

Automatic kinescope bias (AKB) control circuits 75 include plural control circuits each operatively associated with one of the red (R), green (G) and blue (B) kinescope electron guns respectively comprising cathodes 36a, 36b and 36c. Each bias control circuit has an input coupled to the output of current combining network 45 at node A. The plural bias control circuits operate in response to timing signals BIAS SENSE R, BIAS SENSE G and BIAS SENSE B which occur sequentially during respective bias control intervals after the end of vertical retrace, but before the white drive control interval, as seen from FIG. 2. The bias control circuits operate sequentially with respect to each of the R, G, B cathode signal paths, in a manner analogous to that of drive control circuits 60, 62 and 64, but for sensing the black level currents of the plural cathode signal paths. During automatic bias control intervals the BLANK signal is applied to luminance processor 14 and chrominance processor 16, and luminance processor 14 is caused to develop an output black reference level, e.g., in response to an input reference signal.

Timing signal source 55 provides the BIAS SENSE R (red), BIAS SENSE G (green), and BIAS SENSE B (blue) signals. These plural signals each include a positive pulse component for enabling the control circuits in bias control unit 75 to operate individually on a field sequential basis. That is, the pulse components are mutually timed so that the red bias control circuit in unit 75 operates alone during a first field, the green bias control circuit in unit 75 operates alone during the next field, the blue bias control circuit operates alone during the following field, and so on.

The bias control circuits develop output bias control signals $C_R$, $C_G$, and $C_B$ respectively representative of the magnitude of the sensed black currents with respect to a reference level. These control signals are applied to bias control inputs of amplifiers 20, 21 and 22 for maintaining desired black current levels for each of the cathode signal paths. Bias control network 75 maintains proper biasing of the kinescope electron guns to maintain faithful reproduction of color images in the presence of kinescope aging and temperature effects, among other factors which could lead to incorrect kinescope biasing and incorrect image rendition.

Each of the bias control circuits in network 75 can include circuit elements of the type illustrated in connection with blue drive control network 64, for example. Thus each bias control network may include an input switch responsive to an associated BIAS SENSE R, G or B timing signal, a differential comparator rendered operative by an associated BIAS SENSE R, G or B signal to provide an output signal representative of the difference between a reference current and a sensed black current derived from the output of combiner 45, and a storage network coupled to the comparator output for developing a bias control signal.

In connection with the automatic drive control operation, the INHIBIT timing signal is such that switch S1 is rendered non-conductive (i.e., open as shown) for the duration of each WHITE timing signal. This prevents the beam limiter control voltage from network 50 from influencing the characteristics of luminance processor 14 during the white drive control intervals. Otherwise, the beam limiter control signal would undesirably influence the conduction chracteristics of the luminance signal path during the white drive control intervals, thereby resulting in significant distortion of the sensed white drive current conducted by the kinescope.

Switch S1 is timed to operate so that it also remains non-conductive during AKB bias control intervals. Thus the beam limiter control voltage is decoupled from the control input of luminance processor 14 during AKB control intervals.

It is noted that gain control of chrominance processor 16 by the beam limiter control voltage can lead to associated bias offset errors in the R-Y and B-Y outputs of chrominance processor 16. Such bias errors, even if small, if uncorrected can produce noticeable color errors in a reproduced color image particularly in scenes of low luminance content, and can result in a false color tint in the case of a monochrome scene. These undesirable effects are avoided since conductor 52 continously couples the beam limiter control voltage to chrominance processor 16, including intervals when the AKB system operates. Any existing beam limiter induced bias errors are therefore sensed and corrected by the AKB system in the DC coupled kinescope cathode signal coupling paths.

Bias errors at the output of luminance processor 14 also can be developed in response to the gain controlling action of the beam limiter control voltage. In this system such luminance output bias errors are not sensed and compensated for by the AKB system, since switch S1 is non-conductive during AKB automatic bias control intervals in response to the INHIBIT timing signal, whereby the beam limiter control voltage is decoupled from luminance processor 14. However, such luminance output bias errors are less perceptible in a reproduced scene since they result in a relatively less noticeable small change in image brightness. In addition, sensing and correction of such luminance bias errors by the AKB system will consume some of the limited amount of dynamic control range of the AKB system. Accordingly, in some systems it is considered preferable not to consume valuable AKB dynamic control range in this manner, particularly when the visible effect of such luminance bias errors is not disturbing.

The chrominance bias offset errors can result from the effects of small spurious (parasitic) impedances associated with the circuits in chrominance processor 16 to which the beam limiter control signal is applied for gain control purposes. Such spurious impedances are usually unavoidable in both discrete and integrated circuit designs, and can be present in both analog and digital video signal processing circuits as a function of circuit layout and construction. An example of a digital television signal processing system is that recently introduced by the Worldwide Semiconductor Group of International Telephone and Telegraph Corporation, as described in an ITT publication titled "VLSI Digital TV System—DIGIT 2000." That system includes an MAA 2100 Video Codec integrated circuit which incorporates chrominance processing circuits of the type which may be utilized by chrominance processor 16 in FIG. 1.

Figure 3:
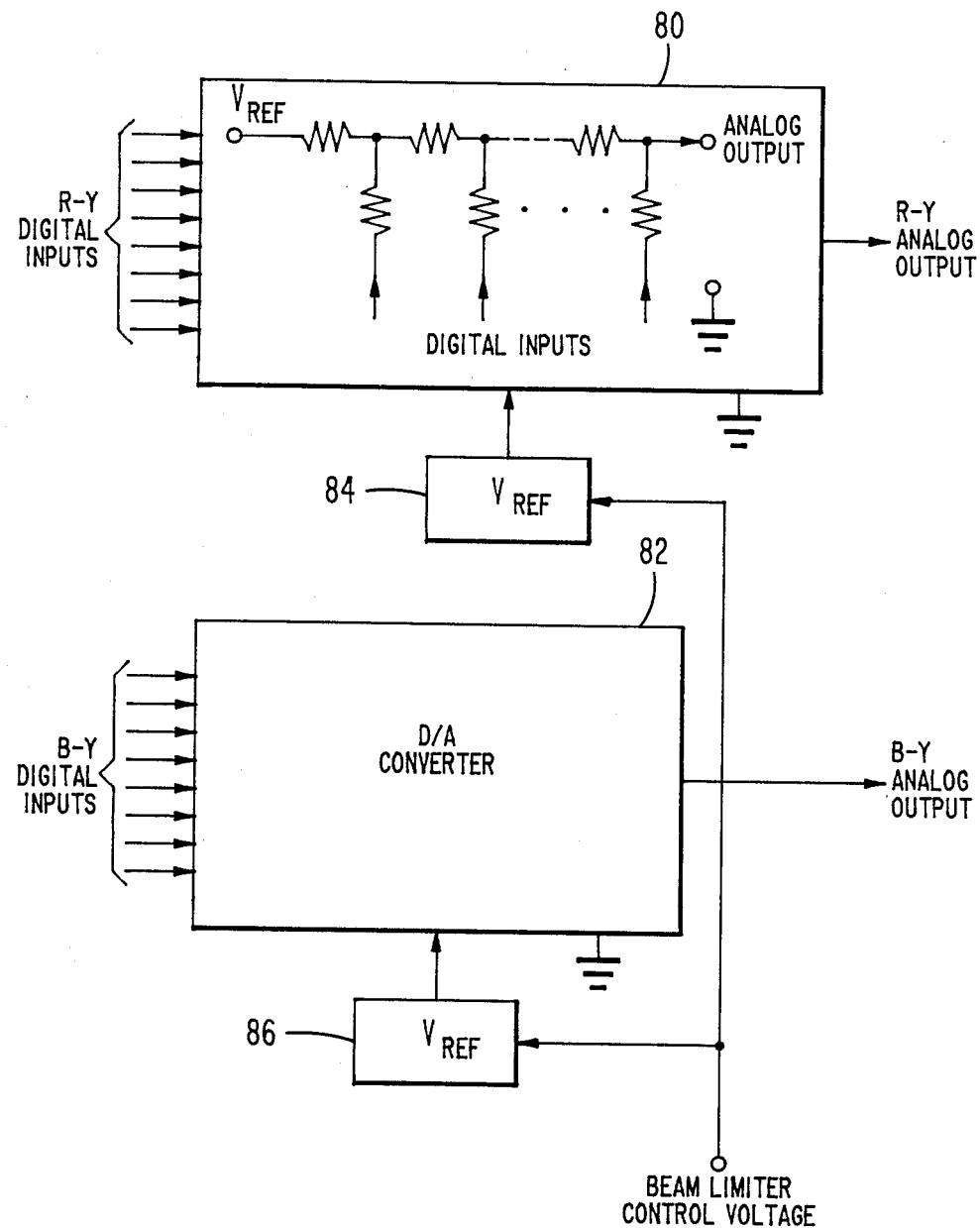
FIG. 3 shows details of a portion of the arrangement of FIG. 1.

In such digital television signal processing system, demodulated color difference signals in digital (binary) form are converted to analog form by means of a digital-to-analog (D/A) converter arrangement associated with the outputs of the chrominance processor, before the demodulated color difference signals are applied to a matrix network such as matrix 18 in FIG. 1. The D/A converter arrangement can be of the type shown in FIG. 3, wherein R-Y and B-Y digital input signals are respectively applied to similar D/A converters 80 and 82 from which R-Y and B-Y analog output signals are respectively provided. The D/A converters are coupled to respective sources 84, 86 of positive, non-zero reference voltages $V_{REF}$, and are also connected to a point of ground potential. As indicated by unit 80, each D/A converter comprises a resistive ladder network to which digital input signal components are applied, and from which a corresponding analog output signal is provided. In this example the signal gain of the chrominance channel is controlled for beam current limiting purposes by controlling the magnitude of (i.e., decreasing) positive reference voltages $V_{REF}$. As each reference voltage is reduced in magnitude, the amplitudes of the analog output color difference signals are reduced accordingly. The presence of unpredictable and usually unavoidable small spurious impedances associated with the construction and layout of the circuitry comprising the D/A converters, such as in the ground connection for the D/A converters, can result in a less effective (i.e., less stable ground potential connection for the D/A converters. This condition can lead to unpredictable output bias offset errors as the levels of the reference voltages are caused to vary with the beam limiter control voltage, which bias errors are permitted to be sensed and compensated for by the automatic bias control system as already discussed.

Apparatus according to the present invention can be used with video signal processing systems employing analog signal processing circuits, as well as digital signal processing circuits such as those included in the digital television signal processing system recently introduced by the Worldwide Semiconductor Group (Freiburg, West Germany) of International Telephone and Telegraph Corporation. The latter system includes integrated circuits comprising the MAA2000 Central Control Unit, the MAA2100 Video Codec Unit and the MAA2200 Video Processor Unit, for providing a digital version of a composite color television signal, luminance-chrominance frequency selection, and various luminance and chrominance processing and control functions, as disclosed in the ITT publication titled "VLSI Digital TV System—DIGIT 2000." This digital television signal processing system also includes an automatic beam current limiter, an automatic white balance control network, and automatic bias control circuits of the type described with reference to circuits 75 as shown and described in connection with FIG. 1. In such as established integrated circuit system it may be undesirable or difficult to change the timing associated with the interactive integrated circuit elements to effect the desired result of having the beam limiter control voltage coupled to the chrominance channel during automatic bias control operating intervals. However, it is herein recognized as being relatively easy to change the connections associated with a switch such as S1 in FIG. 1. Thus an advantage is produced by arranging the switch connections, e.g., via conductor 52 in FIG. 1, to accomplish the desired result without having to resort to changing the switch timing which may be difficult or undesirable for one reason or another.

What is claimed is:

1. In a system including a video channel comprising luminance and chrominance channels for processing a video signal containing image intervals and image blanking intervals, and a current conductive image display device responsive to video signals coupled thereto via said video channel; apparatus comprising:
   automatic drive control means coupled to said video channel for monitoring the conduction of said image display device during prescribed drive control intervals within image blanking intervals, to maintain a desired drive characteristic for said video channel;
   automatic bias control means coupled to said video channel for monitoring the conduction of said image display device during prescribed bias control intervals within image blanking intervals, to maintain a desired bias characteristic for said video channel;

means for automatically limiting excessive beam currents conducted by said image display device in response to video signal image information, said limiting means providing an output beam current limiting control signal;

switching means for selectively coupling said control signal to said luminance channel during intervals including said image intervals; and means for coupling said control signal to said chrominance channel during said image intervals and during said bias control intervals independent of the operation of said switching means.

2. Apparatus according to claim 1, wherein
said control signal is continously coupled to said chrominance channel.

3. Apparatus according to claim 1, wherein
said chrominance channel includes a source of reference voltage, the magnitude of chrominance signals processed by said chrominance channel being a function of the magnitude of said reference voltage; and said control signal is coupled to said source of reference voltage for varying the magnitude of said reference voltage to effect beam current limiting.

4. In a system including a video channel comprising luminance and chrominance channels for processing a video signal containing image intervals and image blanking intervals, and a current conducting image display device responsive to video signals coupled thereto via said video channel; apparatus comprising:

automatic drive control means coupled to said video channel for monitoring the conduction of said image display device during prescribed drive control intervals within image blanking intervals, to maintain a desired drive characteristic for said video channel;

automatic bias control means coupled to said video channel for monitoring the conduction of said image display device during prescribed bias control intervals within image blanking intervals, to maintain a desired bias characteristic for said video channel;

means for automatically limiting excessive beam currents conducted by said image display device in response to video signal image information, said limiting means providing an output beam current limiting control signal;

switching means for selectively coupling said control signal to said luminance channel during intervals including said image intervals, said switching means decoupling said control signal from said luminance channel during said drive control intervals and during said bias control intervals; and means for coupling said control signal to said chrominance channel during said image intervals and during said bias control intervals independent of the operation of said switching means.

5. Apparatus according to claim 4, wherein
said switching means comprises an electronic switch with an input for receiving said control signal and an output coupled to said luminance channel, said switch being rendered non-conductive during said bias control intervals and during said drive control intervals.

6. Apparatus according to claim 4, wherein
a reference signal is applied to said luminance channel during said drive control intervals, said reference signal being of a white-going image sense for increasing the current conduction of said image display device during said drive control intervals; and said automatic drive control means senses the magnitude of currents conducted by said display device in response to said reference signal.

7. Apparatus according to claim 6, wherein
said image display device comprises a kinescope having an electron gun including a cathode intensity control electrode;

said reference signal is applied to said cathode electrode via said luminance channel;

said automatic drive control means senses the magnitude of cathode current during said drive control intervals; and said automatic bias control means senses the magnitude of cathode current during said bias control intervals.

* * * * *